Jan. 28, 1930.   R. A. MORTON   1,745,110
DELIVERY SPOUT
Filed Feb. 18, 1925   3 Sheets-Sheet 2

INVENTOR
ROLLA A. MORTON
BY
ATTORNEYS

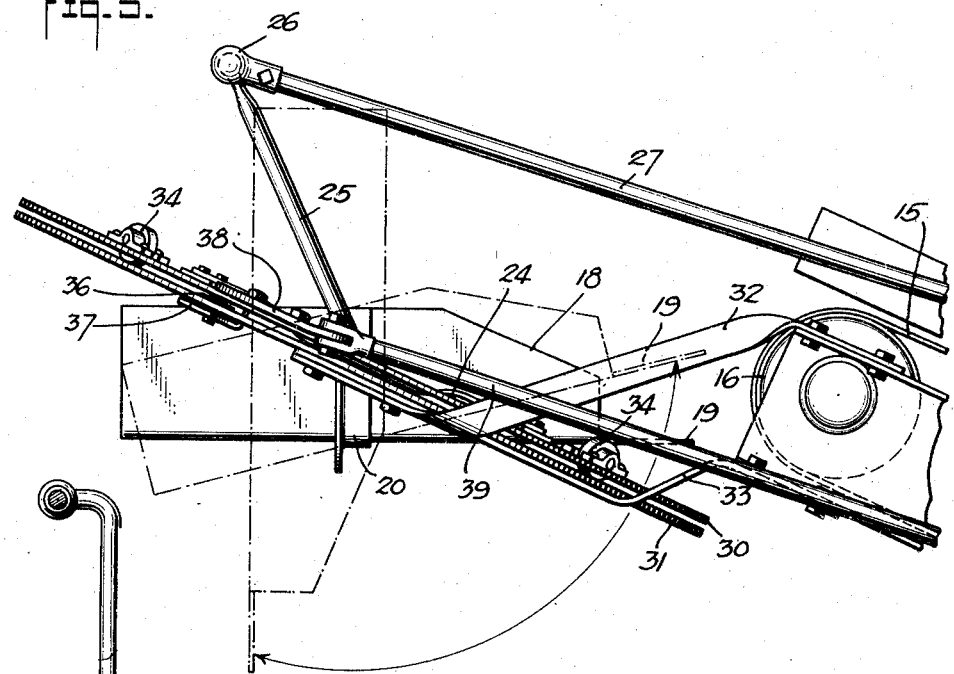
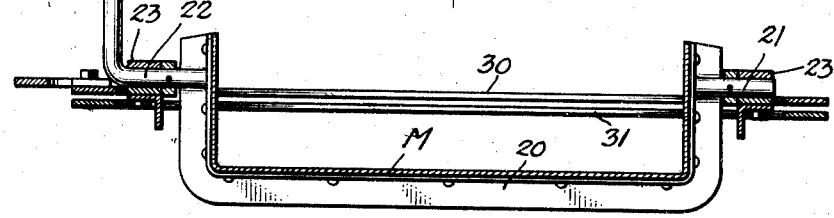
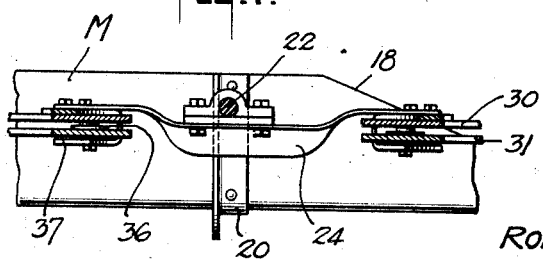

Patented Jan. 28, 1930

1,745,110

UNITED STATES PATENT OFFICE

ROLLA A. MORTON, OF LONG BEACH, CALIFORNIA, ASSIGNOR TO WESTERN WHEELED SCRAPER COMPANY, OF AURORA, ILLINOIS, A CORPORATION OF ILLINOIS

DELIVERY SPOUT

Application filed February 18, 1925. Serial No. 10,138.

My invention relates generally to apparatus for loading vehicles, such as trucks, and more particularly to loading apparatus of the character embodied in Patent No. 1,710,677, issued April 23, 1929, in which a main conveyor is shown for conveying and discharging material to and at a point above the body of the truck to be loaded.

It is a purpose of my invention to provide a delivery spout adapted to be associated with the delivery or discharge end of the main conveyor above referred to and in such manner as to receive and distribute or deflect the material discharged from the conveyor to any desired point within the body of the truck to be loaded whereby, by proper manipulation or adjustment of the spout, an even and uniform distribution of the material into the truck body is effected, and the complete and even filling of the body can be obtained.

It is also a purpose of my invention to provide a delivery spout which is mounted for pivotal movement to allow the adjustment of the spout to any inclined position desired, and to support the pivotal mounting for the spout for bodily movement about another axis perpendicular to the axis of pivotal mounting of the spout so that the spout can be adjusted bodily to different angular positions about this perpendicular axis and without disturbing the angular or inclined adjustment thereof.

I will describe only one form of delivery spout embodying my invention and only one form of loading apparatus with which it is associated, and will then point out the novel features thereof in claims.

In the accompanying drawings

Figure 1:
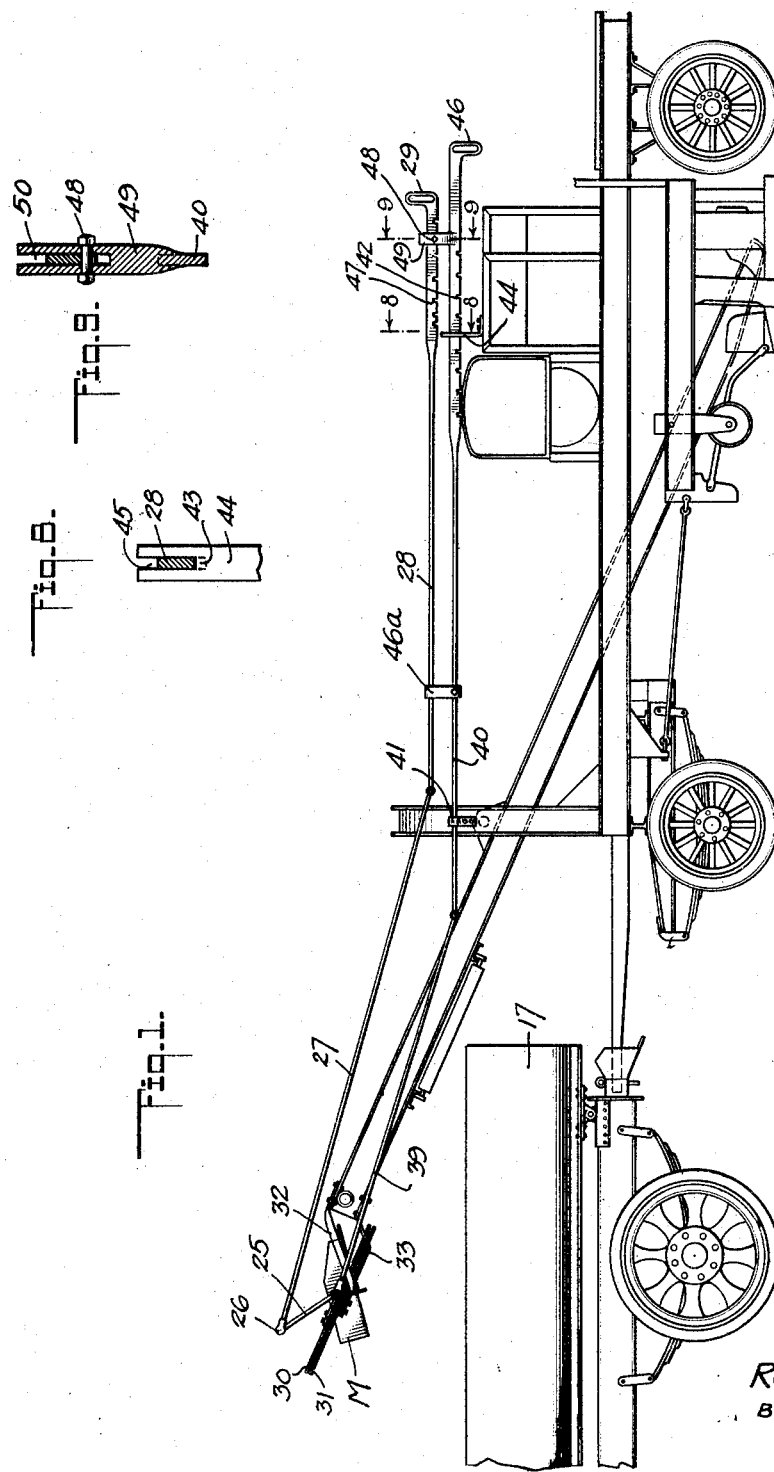
Figure 1 is a view showing in side elevation one form of loading apparatus having applied thereto one form of delivery spout embodying my invention.
Figure 2:
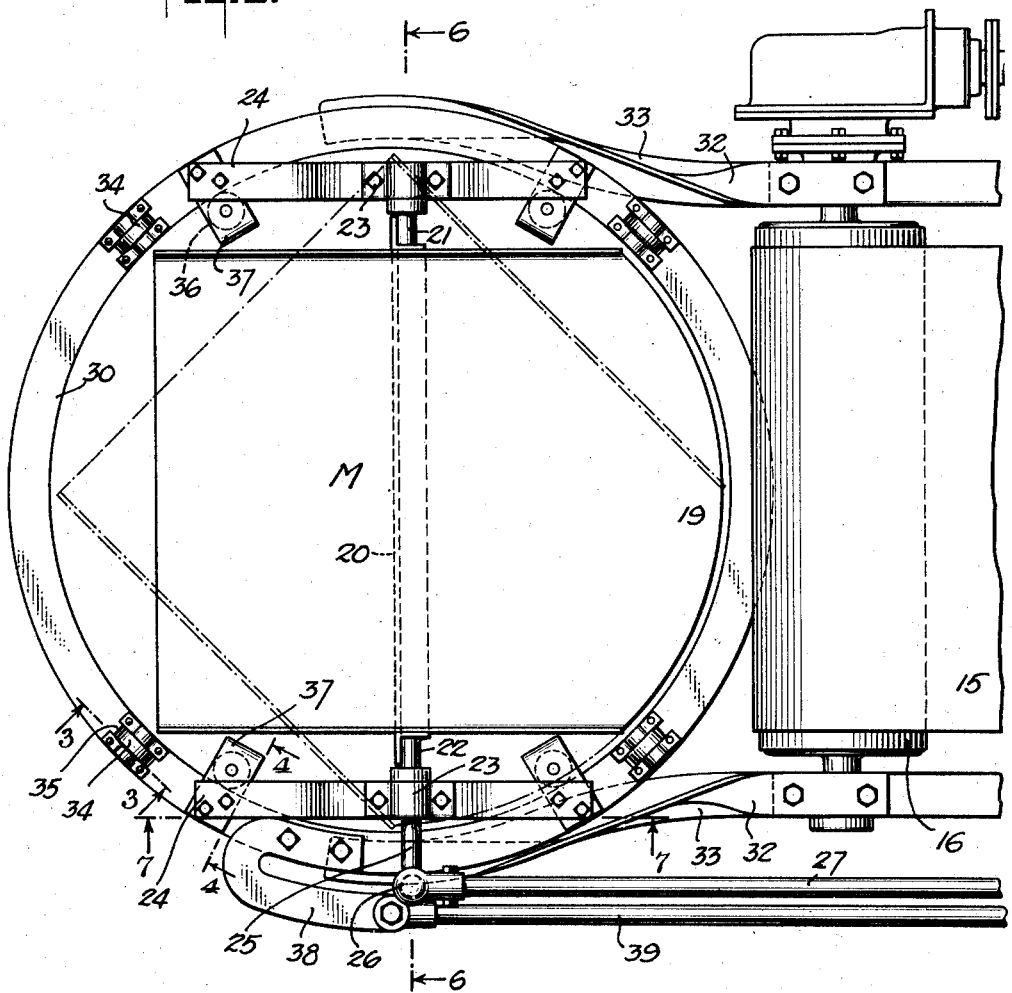
Figure 2 is an enlarged plan view of the delivery spout shown in Figure 1 in applied position with respect to the main conveyor of the loading apparatus.
Figure 3:
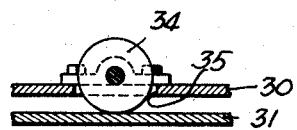
Figure 4:
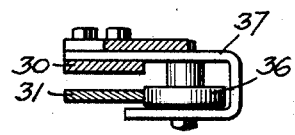

Figures 3 and 4 are fragmentary sectional views taken on the lines 3—3 and 4—4, respectively, of Figure 2;

Figure 5 is a view showing in side elevation the delivery spout shown in the preceding views and in applied position to the delivery end of the main conveyor;

Figures 6 and 7 are vertical sectional views taken on the lines 6—6 and 7—7, respectively, of Figure 2;

Figures 8 and 9 are fragmentary sectional views taken on the lines 8—8 and 9—9, respectively, of Figure 1.

Similar reference characters refer to similar parts in each of the several views.

Referring specifically to the drawings, and particularly to Figure 1, I have here shown a loading apparatus similar to the apparatus embodied in the application hereinbefore referred to, such apparatus including a main conveyor having an endless belt 15 trained about an upper roller 16. Means is provided for driving the belt 15 in such direction that material placed thereon at its lower end will be carried upwardly and discharged from its upper end or at a point adjacent the roller 16. The loading apparatus is shown connected to the rear end of a motor truck having a body 17 into which the material delivered to the upper end of the conveyor is adapted to be discharged.

My invention is adapted for association with the upper or delivery end of the main conveyor of the loading apparatus and is designed to control the discharge of material into the truck body in such manner that an even and complete loading of the body is effected. The delivery spout in its present embodiment includes a spout member M which, as clearly shown in Figures 5 and 6, is of U-form in cross section, and with the side walls at one end tapered as indicated at 18 so as not to interfere with the passage of the material into the same. Further, a lip 19 (Figure 5) projects beyond the tapered side walls of the spout and constitutes in effect a continuation of the bottom of the spout. This lip 19, when the inner end of the spout is turned up to, or somewhat above, a substantially horizontal position, serves to catch and thus prevent material from being discharged downwardly between the spout and the delivery end of the conveyor. As clearly shown in Figure 6, the spout is rigidly secured between its ends to a U-shaped frame 20, and the frame in turn is mounted for pivotal movement about a generally horizontal axis by means of stub axles 21 and 22 journaled in trunnions 23 secured to brackets 24. The stub axle 22, as shown in Figure 6, is extended to provide a crank arm 25 having a ball and socket connection 26 with a rod 27 which, as clearly shown in Figure 1, extends rearwardly and downwardly for connection with a control rod 28 mounted for longitudinal movement upon the loading apparatus, and provided at its rear end with a handle 29 which is adapted to be gripped in effecting movement of the control rod.

The brackets 24 are in the form of bars, the ends of which are secured to an annulus 30 which constitutes a part of a rotary turntable or mounting for effecting rotary adjustment of the spout and its pivotal mounting. The annulus 30 is mounted for rotary movement upon a stationary annulus 31, the latter being rigidly supported upon the delivery end of the conveyor by means of upper brackets 32 secured to the upper edge of the frame of the conveyor, and lower brackets 33 secured to the lower edge of the conveyor frame. These brackets are arranged in pairs, each pair including one upper bracket and one lower bracket, and the brackets of each pair are secured to the stationary annulus 31 at a point diametrically opposed with respect to the connection of the other pair of brackets to the annulus. The brackets are bent to dispose the stationary annulus in a plane parallel with the plane of the conveyor but below the latter, as clearly illustrated in Figure 5.

The movable annulus 30 is rotatably mounted upon the stationary annulus through the medium of rollers 34 extending through slots 35 (Figure 3) in the movable annulus and having contact with the upper side of the stationary annulus. Guide rollers 36 are mounted in yokes 37 (Figure 4) secured to the annulus 30 so that the rollers have rolling contact with the inner periphery of the stationary annulus 31. These rollers take up side thrust of the movable annulus and at the same time serve to maintain the movable annulus in proper position with respect to the stationary annulus. The rollers 34 carry the load of the movable annulus and the delivery spout carried by the latter.

As clearly shown in Figures 1 and 2 a substantially J-shaped connecting bar 38 is secured to the movable annulus 30 and has pivotal connection with a connecting rod 39 which extends rearwardly and downwardly and has pivotal connection with a control rod 40. The rod 40 is slidably mounted in a bracket 41 secured to the frame of the loading apparatus, and is provided with notches 42, any one of which is adapted to receive the intermediate portion 43 of a latch member 44 secured to the frame of the loading apparatus. As clearly shown in Figure 8 the latch member 44 is bifurcated at its upper end, to provide a slot 45 which slidably receives the control rod 40 and allows the latter to be lifted so that the intermediate portion 43 is removed from the notches to permit of the longitudinal adjustment of the control rod. It will be understood that when the intermediate portion 43 is within any one of the notches the control rod is locked against longitudinal movement. The end of the control rod 40 is provided with a handle 46 which is adapted to be gripped in manipulating the rod. The guide bracket 46$^a$ is secured to the control rod 40 and serves to slidably support the forward end of the control rod 28. The rear end of the control rod 28 is likewise formed with notches 47 which co-operate with a bolt 48 (Figure 9) to lock the rod against longitudinal movement. The bolt 48 is carried by a bracket 49 mounted on the rod 40 and having a bifurcated end to provide a slot 50 which slidably receives the rod 28.

The operation of the delivery spout and the adjusting means therefor is as follows:

With the delivery end of the conveyor in overlying relation to the body 17 of the truck, it will be clear that material deposited upon the belt 15 of the conveyor will be discharged onto or against the spout member M, and from the latter the material will precipitate into the body of the truck. The belt 15 may be driven continuously regardless of the position of said spout member, which may be used either as a spout upon which the material carried up by the belt 15 may be deposited and directed to the point where it is to be delivered, or said spout member may be used merely as a deflector to prevent scattering of the material delivered by said belt. By manipulating the control rod 28, the crank arm 25 can be manipulated to swing the spout member M about the stub axles 21 and 22 as a center and thereby vary the inclination of the member. As shown in Figure 5, the spout member M can be tipped lengthwise, or about a transverse axis, to move it from the horizontal position shown in solid lines to the vertical position shown in dot and dash lines in which the end carrying the lip 19 is lowermost, and it will be understood that through manipulation of the control rod 28 the spout member can be adjusted to occupy any intermediate position between these two extreme positions. Further, the spout member can be tilted about a transverse axis downwardly from the horizontal position shown as indicated in dot and dash lines to discharge at its opposite end. The belt 15 may if desired be continued in operation when the spout is tipped to an approximately vertical position, as indicated in Fig. 5, in which case the material passing over the roller 16 will be deposited directly in the truck without passing over the spout, which, in that case will serve as a deflector to prevent scattering of the material. It will be observed that the transverse axis about which the spout tilts lengthwise is parallel with the plane in which the turntable rotates, and by adjustment of the control rod 40 the spout member and its pivotal mounting can be rotated in one direction or the other to effect a lateral turning of the spout member about the axis of the turnable as a center and incidentally tip it sidewise.

From the foregoing description it will be manifest that through manual manipulation of the control rods 28 and 48 an adjustment of the spout member about its pivotal mounting can be effected and a bodily adjustment thereof about an axis at right angles to its pivotal axis, and that either adjustment can be maintained through the co-operation of the notched portions and latch members previously described. In this manner the spout member can be adjusted to direct the flow of material from the delivery end of the conveyor to any point within the body of the truck so that the complete and even loading of the truck with the material can be readily effected. It is to be particularly noted that the bracket 49 carrying the latch member or bolt 48 is supported directly on the control rod 40 so that it moves with the latter, and when the bolt 48 is engaging within any one of the notches 47 of the control rod 28 longitudinal movement of the control rod 40 will effect a corresponding movement of the control rod 28 so as to allow the crank arm 25 to respond to the rotational movement of the movable annulus 30 and thus maintain its adjusted position, so that the angular position of the spout member will remain undisturbed.

What I claim is:

1. In combination, a conveyor, a spout for receiving material from the conveyor, means adjustably supporting the spout to turn laterally, and to tilt vertically about a transverse axis, means operable to tilt the spout about a transverse axis and maintain it in its adjusted position, and means operable to turn the spout about an axis perpendicular to said transverse axis without varying its adjustment about said transverse axis.

2. In combination, a delivery spout, a pivotal mounting therefor, a rotary mounting for the pivotal mounting, means for adjusting and maintaining the spout on its pivotal mounting for discharging from either end thereof, and means operable to adjust the rotary mounting to vary the position of the pivotal mounting.

3. In combination, a delivery spout mounted for pivotal movement about a substantially horizontal axis for tipping either end of said spout to discharging position, and a turntable for supporting the spout and its mounting for movement about an axis substantially perpendicular to said first axis.

4. In combination, a delivery spout, a pivotal mounting therefor, a rotary mounting for the pivotal mounting, means manually operable from a remote point for adjusting the spout on its pivotal mounting for enabling said spout to discharge from either end thereof, and means manually operable from a remote point for adjusting the rotary mounting to vary the position of the pivotal mounting.

5. In combination, a stationary member, a movable member movable on the stationary member, a delivery spout pivotally supported on the movable member, and manually operable means for moving the movable member, and for rocking the delivery spout on its pivot to discharge from different ends thereof.

6. In combination, a stationary member, a movable member movable on the stationary member, rollers interposed between the members, other rollers carried by the movable member and engaging the stationary member for maintaining the movable member in definite relation to the stationary member, a delivery spout pivoted on the movable member for tilting movement within said movable member, and means for moving the movable member and said spout on its pivot.

7. In combination, a stationary annulus, a movable annulus, rollers carried by one of the annuli and having rolling contact with the other to take the vertical load of the movable annulus, guide rollers carried by the movable annulus and engaging the inner periphery of the stationary annulus, a delivery spout pivoted on the movable annulus for tipping either end of said spout to discharge position, and means for moving the spout on its pivot and for rotating the movable annulus in either direction.

8. In combination, a stationary annulus, a movable annulus, rollers carried by one of the annuli and having rolling contact with the other to take the vertical load of the movable annulus, guide rollers carried by the movable annulus and engaging the inner periphery of the stationary annulus, a delivery spout pivoted on the movable annulus for tipping either end of said spout to discharge position, means for moving the spout on its pivot and for rotating the movable annulus in either direction, said means including notched control rods, and latch members associated with said control rods for locking the latter in any adjusted position to maintain a definite adjustment of the delivery spout and the movable annulus.

9. In combination, a stationary annulus, a movable annulus, rollers carried by one of the annuli and having rolling contact with the other to take the vertical load of the movable annulus, guides rollers carried by the movable annulus and engaging the inner periphery of the stationary annulus, a delivery spout pivoted on the movable annulus for tipping either end of said spout to discharge position, means for moving the spout on its pivot and for rotating the movable annulus in either direction, said means including notched control rods, and latch members associated with the control rods for locking the latter in any adjusted position to maintain a definite adjustment of the delivery spout and the movable annulus, one of said latch members operatively connecting said control rods to each other so that when moving that rod for adjusting the movable annulus the other control rod will be moved to maintain the delivery spout in definite angular position.

10. In combination, a stationary annulus, means adapted to rigidly support the annulus adjacent the delivery end of a conveyor, a movable annulus above the stationary annulus and rotatable in either direction thereon, brackets secured to the movable annulus, a frame, stub axles secured to the frame and journaled in said brackets, a crank constituting a continuation of one of the stub axles, a control rod mounted for longitudinal movement, a connecting rod connecting the control rod with said crank, and releasable means for securing the control rod in any longitudinal adjusted position.

11. A combination as embodied in claim 10 including a second connecting rod operatively connected to the movable annulus, a second control rod mounted for longitudinal movement and connected to the last mentioned connecting rod, and releasable means for locking the last mentioned control rod in any longitudinal adjusted position.

12. In apparatus of the class described, the combination of a distributing member, means for discharging material to said distributing member, said member discharging the material from a discharge edge thereof, and means operable to tip said distributing member sidewise to incline said discharge edge laterally whereby to cause the greater portion of the material to be distributed at a different point of said discharge edge.

13. In apparatus of the class described, the combination of a distributing member, means for discharging material to said distributing member, and pivotal mounting means for said distributing member, said pivotal mounting means enabling said distributing member to be tilted lengthwise and sidewise to cause the material to be discharged from either end and at either side of said distributing member.

14. In apparatus of the class described, the combination of a distributing member, means for discharging material to said distributing member, pivotal mounting means for said distributing member, said pivotal mounting means enabling said distributing member to be tilted in one plane to cause the material to be discharged from either end of said distributing member, and means supporting said distributing member for movement in another plane.

15. In apparatus of the class described, the combination of a conveyor, a distributing member adapted to receive material discharged by said conveyor, and means supporting said distributing member and operable to tilt it lengthwise, to swing it laterally, and to tilt it sidewise.

16. In apparatus of the class described, the combination of material conveying means, and a spout associated with the delivery end of said conveying means for directing the discharge of material in different directions, said spout being of U-shape, and a turntable pivotally supporting said spout intermediate its ends for tilting movement relatively to the plane in which said turntable rotates, said spout being disposed within said turntable.

17. In apparatus of the class described, the combination of a conveyor, a distributing member supported thereby below and beyond the discharge end of said conveyor, said distributing member comprising a generally flat deflecting surface having side walls for confining the direction of motion of the material across said deflecting surface, and means pivotally supporting said distributing member to tilt endwise laterally, and to tilt sidewise in either direction.

18. In apparatus of the class described, the combination of a distributing spout, a pivotal mounting therefor, a rotary mounting for said pivotal mounting, a control element operatively connected for moving said spout about said pivotal mounting, a second control element operatively connected for causing said pivotal mounting to revolve about said rotary mounting, and means for normally causing one of said control elements to move simultaneously with the other control element, said means permitting independent operation of said elements.

19. In combination, a support, a turntable rotatably mounted on said support, and a spout of trough shape carried by said turntable, said turntable rotating in an inclined plane to dispose one lateral edge of said trough shaper spout higher than the other lateral edge when said turntable has been revolved to different angles of discharge.

20. In combination, an upwardly extending conveyor, a turntable rotatably supported adjacent the discharge end of said conveyor, said turntable being mounted for rotation in an inclined plane substantially parallel with the plane of the conveyor, and a spout of trough shape pivotally supported on said turntable.

21. In combination, an upwardly extending conveyor, a turntable rotatably supported adjacent the discharge end of said conveyor, said turntable being mounted for rotation in and inclined plane substantially parallel with the plane of the conveyor, and a spout carried by said turntable.

22. In combination, a conveyor, a turntable supported thereby beyond and adjacent to the delivery end thereof, said turntable being rotatable in an inclined plane, and a spout pivotally mounted on said turntable to tilt endwise about a transverse axis parallel with the plane of rotation of said turntable.

23. In combination, a turntable, a spout pivotally supported on said turntable, and means supporting said turntable for rotation around an inclined axis, whereby the pivotal axis of said spout can be inclined to different vertical angles.

ROLLA A. MORTON.